United States Patent
Kulkarni

(10) Patent No.: US 11,601,056 B2
(45) Date of Patent: Mar. 7, 2023

(54) HYBRID ARCHITECTURE FOR DC-DC CONVERSION

(71) Applicant: Dialog Semiconductor (UK) Limited, London (GB)

(72) Inventor: Santosh Kulkarni, Swindon (GB)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 17/384,944

(22) Filed: Jul. 26, 2021

(65) Prior Publication Data

US 2023/0026364 A1    Jan. 26, 2023

(51) Int. Cl.
*H02M 3/158* (2006.01)
*H02M 1/08* (2006.01)
*H02M 1/00* (2006.01)

(52) U.S. Cl.
CPC ......... *H02M 3/1582* (2013.01); *H02M 1/007* (2021.05); *H02M 1/0095* (2021.05); *H02M 1/08* (2013.01)

(58) Field of Classification Search
CPC .. H02M 3/1582; H02M 1/007; H02M 1/0095; H02M 1/08
See application file for complete search history.

(56) References Cited

U.S. PATENT DOCUMENTS

| | | | |
|---|---|---|---|
| 8,854,019 B1 | 10/2014 | Levesque et al. | |
| 9,143,032 B2 | 9/2015 | Le et al. | |
| 10,910,947 B2 | 2/2021 | Cavallini et al. | |
| 11,005,371 B2 | 5/2021 | Cannillo et al. | |
| 2009/0102439 A1* | 4/2009 | Williams | H02M 3/07 323/266 |
| 2013/0234513 A1 | 9/2013 | Bayer | |
| 2017/0149337 A1 | 5/2017 | Petersen | |
| 2019/0052173 A1 | 2/2019 | Shumkov et al. | |
| 2020/0328675 A1 | 10/2020 | Seo et al. | |
| 2020/0350817 A1 | 11/2020 | De et al. | |
| 2022/0247310 A1* | 8/2022 | Wittenbreder, Jr. | H02M 1/0054 |

FOREIGN PATENT DOCUMENTS

| | | |
|---|---|---|
| DE | 10 2018 222 905 A1 | 7/2020 |
| DE | 10 2019 206 421 A1 | 11/2020 |

OTHER PUBLICATIONS

German Office Action, File No. 10 2021 212 140.3, Applicant: Dialog Semiconductor (UK) Limited, dated Jun. 5, 2022, 6 pages.

(Continued)

*Primary Examiner* — Adolf D Berhane
*Assistant Examiner* — Afework S Demisse
(74) *Attorney, Agent, or Firm* — Saile Ackerman LLC; Stephen B. Ackerman

(57) ABSTRACT

A Hybrid DC-DC switching converter architecture is described. The Hybrid architecture includes a capacitive converter cascaded by an inductive converter for a boost switching converter, and an inductive converter cascaded by a capacitive converter for a buck switching converter. A capacitor at an intermediate node and a switch in the capacitive converter are removed. Reducing the switching converter by one switch and one capacitor results in a smaller implementation area. A single regulation circuit and an inductor with a smaller saturation current (Isat) are used.

25 Claims, 9 Drawing Sheets

(56) References Cited

OTHER PUBLICATIONS

"S-Hybrid Step-down DC-DC Converter-Analysis of Operation and Design Considerations," by Gab-Su Seo et al., IEEE Transactions on Industrial Electronics, vol. 67, No. 1, pp. 265-275, Jan. 2020, doi: 10.1109/TIE.2019.2897537.
"Dual Inductor Hybrid Converter for Point-of-Load Voltage Regulator Modules," by Gab-Su Seo et al., IEEE Transactions on Industry Applications, vol. 56, No. 1, pp. 367-377, Jan.-Feb. 2020, doi: 10.1109/TIA.2019.2941945.
"High-Performance Controllers for Emerging Converter Topologies and Low-Power High-Frequency SMPS," by Aleksandar Prodic, IEEE PwrSoC 2018, Laboratory for Power Management and Integrated SMPS University of Toronto, E. Rogers ECE Department, 50 pages.
"Converter Topologies for Large Conversation Ratios: A Story from SI,SC to Hybrid Architectures," 2018 © iPower3Es University of Colorado Boulder, by Hanh-Phuc Le, 23 pages.

\* cited by examiner

HYBRID ARCHITECTURE FOR DC-DC CONVERSION

FIELD

The present disclosure relates generally to hybrid architecture for DC-DC conversion. More particularly, the present invention relates to a hybrid architecture which achieves higher power density, smaller solution area and improved efficiency.

BACKGROUND

The traditional boost converters have a single stage architecture with a single inductor and capacitor to filter the output voltage, as shown in 100 of FIG. 1. The drawback of this architecture is the need for large passive components to achieve good performance. Also, the power density is limited to the saturation current of the inductor. In order to increase the output current of the boost converter, there is a need to increase the saturation current of the inductor, either by selecting a bigger inductor or using a number of inductors in a multi-phase topology. With both approaches, there is a penalty in terms for performance or size.

The alternate approach is to use a hybrid converter or Multi-level converter, which uses voltage breaking topologies to better manage the performance of the converter. The hybrid boost architectures reported in literature have either an extra inductor or capacitor or both, as shown in 200 of FIG. 2. This approach still does not address the challenge of increased output power, as the performance is limited by the saturation current (Isat) of the inductor, and as the inductor is at the front end, it has to handle higher current.

The issues highlighted in the paragraphs above also extend to buck converters. Currently, almost all of the hybrid buck converters use a switch capacitor converter as the first stage of a step-down DC-DC converter, followed by a buck converter, as shown in 300 of FIG. 3. The advantage of this approach is a reduction in passive components by reducing the voltage swing across the inductor and capacitor.

An alternate implementation of hybrid architecture is a multi-level DC-DC converter, where a similar reduction in voltage swing on the inductor and capacitor can be achieved, as shown in FIG. 4A and FIG. 4B.

Two different implementations of multi-level architecture are illustrated in FIG. 4A and FIG. 4B. FIG. 4A shows 400, a Meynard topology using a flying capacitor, and FIG. 4B shows 450, a Nishijima topology using a flying inductor. The key disadvantage of the hybrid architectures described in this section, is that the inductor is at the output and has to drive the entire load current. This would require the inductor to have very small direct current resistance (DCR) and very high saturation current. Hence, the inductor needs to be large and results in higher AC losses, which in turn cancels the benefits gained from reducing the voltage swing through the hybrid architecture.

Hence, hybrid converters have seen limited implementation in product form.

SUMMARY

Accordingly, it is an objective of one or more embodiments of the present disclosure to provide a Hybrid architecture which achieves higher power density, smaller solution area, and improved efficiency in a DC-DC switching converter.

It is a further of one or more embodiments of the disclosure to provide a Hybrid switching converter that requires a smaller size inductor, a smaller saturation current, and a smaller flying capacitor in comparison to a traditional hybrid architecture.

Still further, it is an object of one or more embodiments of the disclosure for the Hybrid switching converter to have one switch and one capacitor less than a traditional hybrid architecture.

Still further, it is an object of one or more embodiments of the disclosure to provide a Hybrid switching converter that does not require loop regulation of the flying capacitor and that can be regulated with a single loop for both the flying capacitor and the inductor.

Other objects will appear hereinafter.

The above and other objects of the present disclosure may be accomplished in the following manner. A hybrid DC-DC boost switching converter architecture is described, including a first stage, comprising a capacitive converter, wherein the capacitive converter comprises a plurality of switches and a capacitor, and a second stage, comprising an inductive converter, wherein the first stage is cascaded by the second stage.

A hybrid DC-DC buck switching converter architecture is also described, including a first stage, comprising an inductive converter, and a second stage, comprising a capacitive converter, the capacitive converter comprising a plurality of switches and a capacitor, wherein the first stage is cascaded by a second stage.

The above and other objects of the present disclosure may be further accomplished with a method for a Hybrid architecture for DC-DC conversion. The steps include cascading a first stage comprising a plurality of switches and a capacitor, by a second stage comprising an inductive converter, for a boost switching converter. The steps also include cascading a first stage comprising an inductive converter, by a second stage comprising a plurality of switches and a capacitor, for a buck switching converter.

In various embodiments, the Hybrid switching converter architecture is implemented for boost operation.

In various embodiments, the Hybrid switching converter architecture is implemented for buck operation.

In various embodiments, the Hybrid switching converter architecture is implemented for multi-phase operation.

In various embodiments, the Hybrid switching converter architecture is regulated with current mode control.

In various embodiments, the Hybrid switching converter architecture is regulated with voltage mode control.

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DETAILED DESCRIPTION

The present disclosure describes a Hybrid switching converter with one less switch and one less capacitor than the traditional hybrid architecture. For this architecture, five switches and two capacitors are needed for both buck or boost operation, which is one less of each as compared to traditional cascaded switch capacitor and hybrid switching converter architectures.

The Hybrid switching converter of the present disclosure does not require loop regulation of the flying capacitor and can be regulated with a single loop for both the flying capacitor and the inductor. No separate regulation loop is required as in multi-level switching converter architectures.

Furthermore, the claimed Hybrid switching converter requires a smaller inductor and smaller flying capacitor in comparison to traditional hybrid architecture. The inductor in the first stage, for a buck example, will see a fraction of output current, along with lower voltage swing across the inductor. The actual value of DC current in the first stage depends on the type of switch capacitor circuit in the second stage. For example, for a 2-1 switch capacitor converter in the second stage, the inductor will see half the DC current. Hence, a smaller inductor will be required to meet the target performance.

Figure 1:
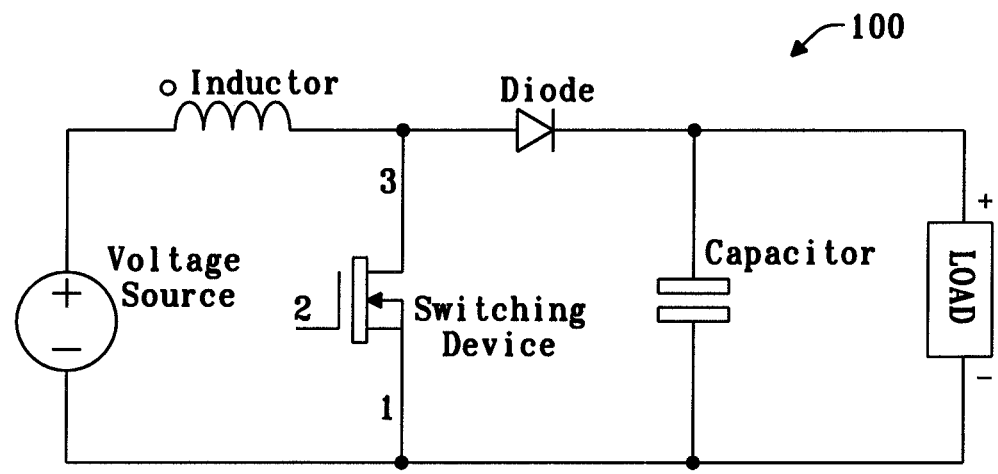
FIG. 1 shows a traditional boost converter.
Figure 2:
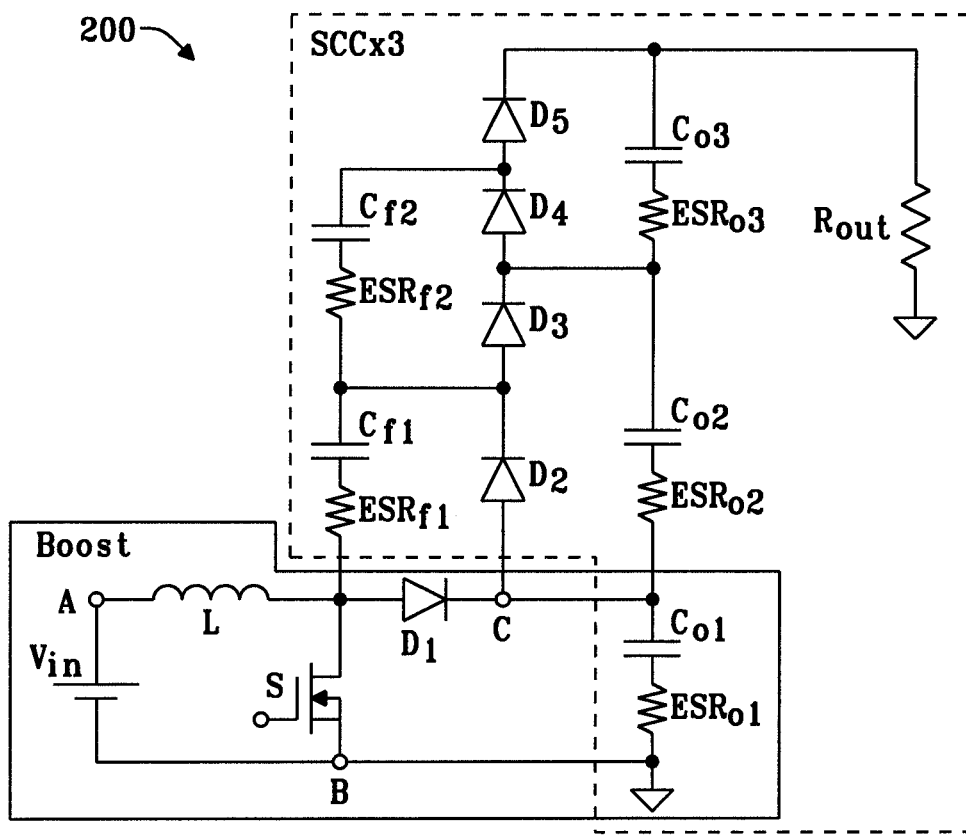
FIG. 2 shows a hybrid boost converter.
Figure 3:
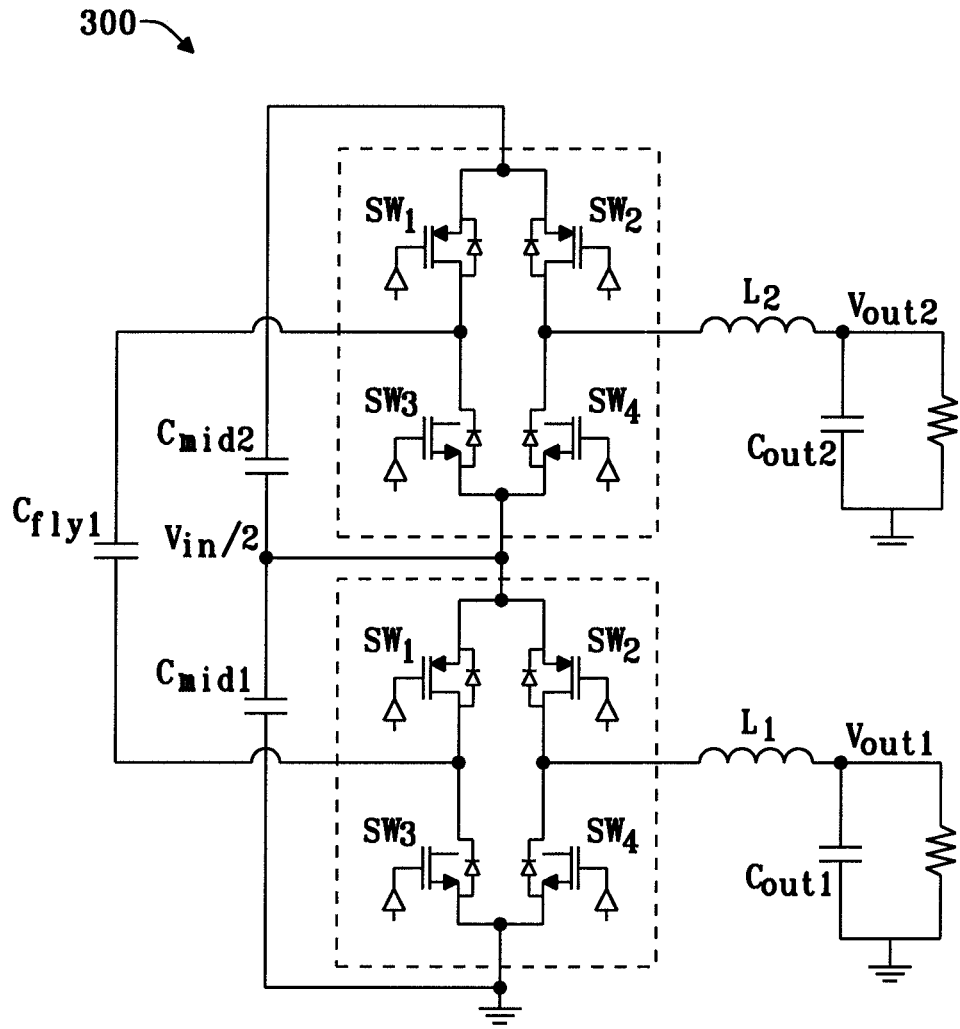
FIG. 3 shows an existing hybrid buck converter with a dual output.
Figure 4A:
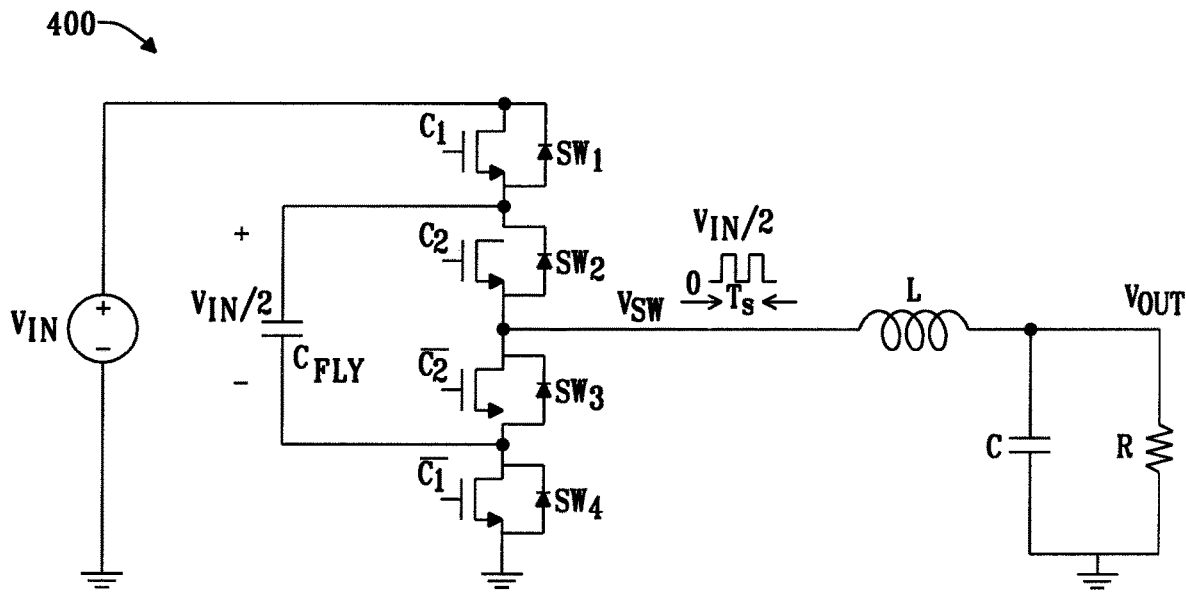
FIG. 4A shows a multi-level hybrid converter using a Meynard topology.
Figure 4B:
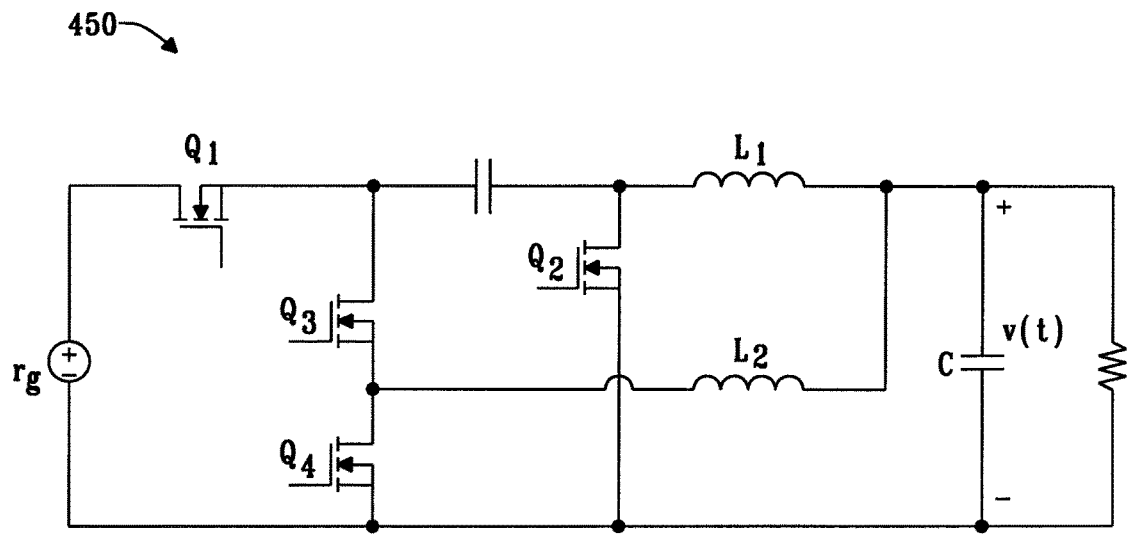
FIG. 4B shows a multi-level hybrid converter using a Nishijima topology.
Figure 5:
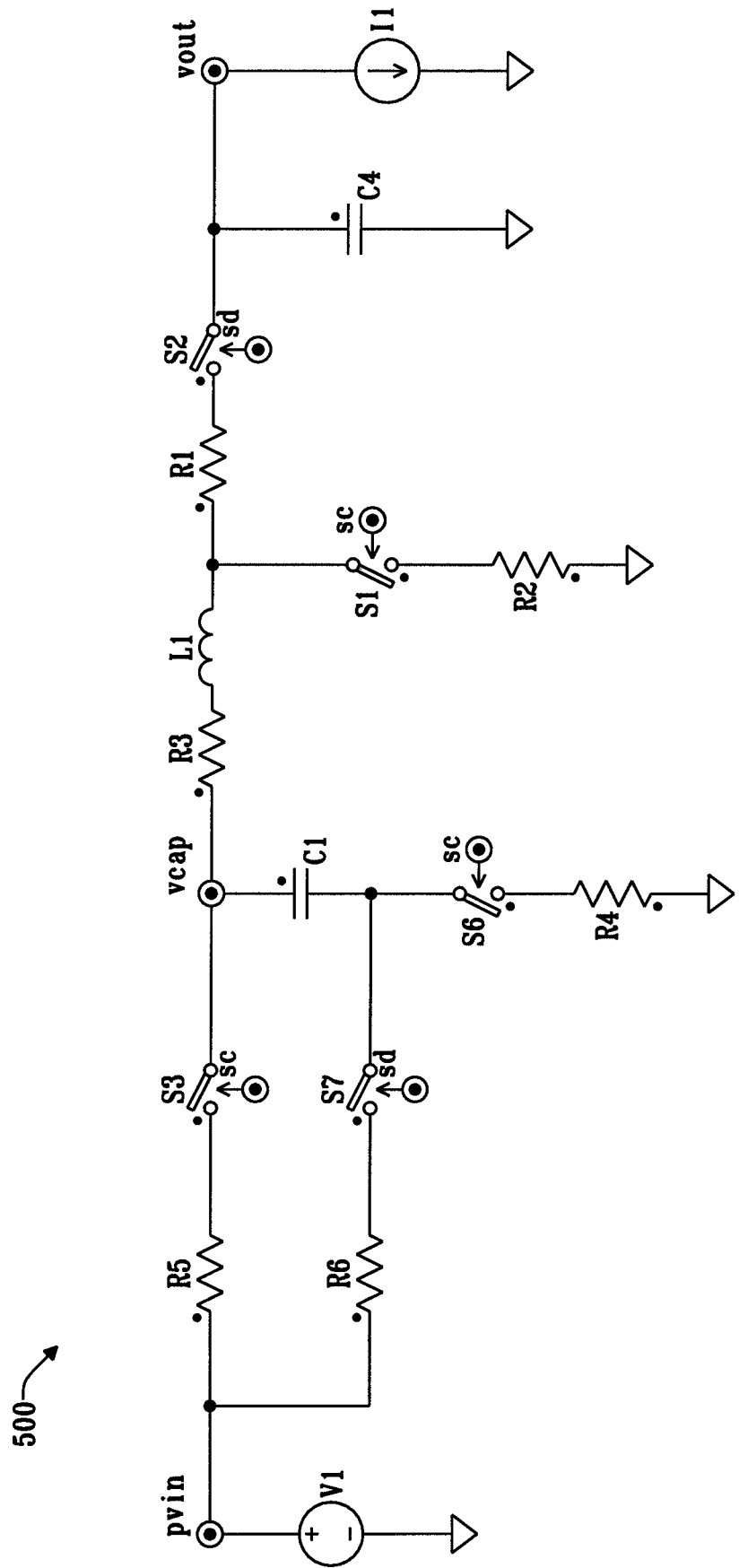
FIG. 5 shows a Hybrid boost architecture, with a charge pump as the first stage and a boost converter as the second stage, of the present disclosure.

FIG. 5 shows a Hybrid boost architecture with a charge pump and a boost converter, embodying the principles of the disclosure. The proposed boost architecture 500 includes a charge pump comprising switches (S3, S6, S7) and a single flying capacitor C1 in the first stage, and a boost converter comprising switches (S1, S2) and a single inductor L1 in the second stage.

In the charge pump of the Hybrid boost architecture, a first resistor R5 is connected between input voltage pvin and a first node of a first switch S3, and a second resistor R6 is between pvin and a first node of a second switch S7. Flying capacitor C1 is connected between intermediate node vcap, which is also a second node of S3, and a first node of a third switch S6, which is also a second node of S7. A third resistor R4 is connected between a second node of S6 and a reference terminal (e.g. ground).

In the boost switching converter of the Hybrid boost architecture, a fourth resistor R3 is connected between vcap and a first node of an inductor L1, and a first node of a fourth switch S1 is connected between a second node of L1 and a fifth resistor R2. A sixth resistor R1 is connected between the second node of L1 and a first node of a fifth switch S2, and a second capacitor C4 is connected between a second node of S2 (which is also output voltage vout) and a reference terminal (e.g. ground).

Switches S1, S3, and S6 are controlled by pulse waveform 'sc' and switches S2 and S7 are controlled by pulse waveform 'sd'. Flying capacitor C1 does not require a separate regulation loop as in the prior art, and a single regulation loop can be used for both the switched capacitor and boost converter circuits.

Typical hybrid architecture has a charge pump regulated by sensing the voltage on the flying capacitor, and depending on the voltage of the flying capacitor, the control circuit turns the switches ON/OFF, in addition to the regulation required by the buck/boost switching converter. In the hybrid architecture of the disclosure, the switches in the charge pump are defined to operate with fixed pulse waveforms, as the regulation is done in the switching converter by measuring the inductor current and output voltage. Hence, the flying capacitor of the present disclosure does not require a separate regulation loop as compared to the standard switching converter.

Figure 6:
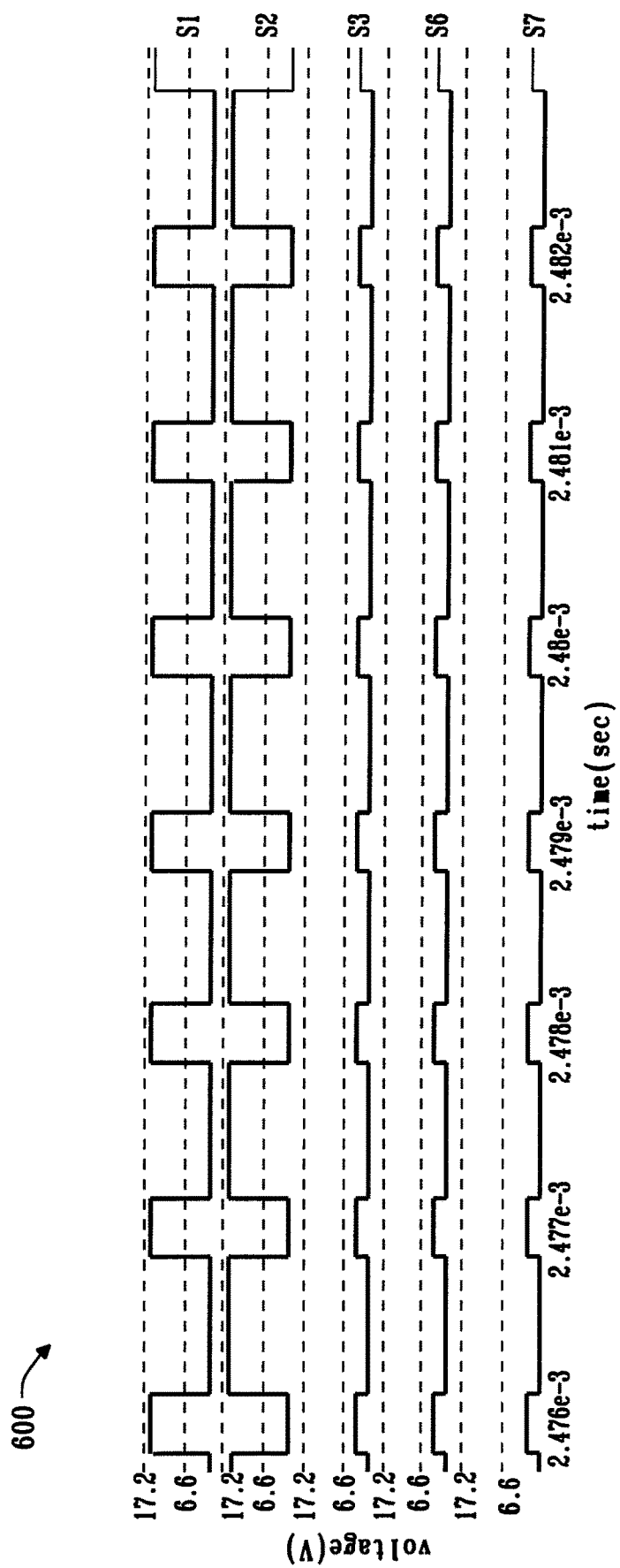
FIG. 6 shows timing waveforms for different switches of a Hybrid boost architecture.

FIG. 6 shows the timing waveforms for the Hybrid boost architecture of FIG. 5. Timing waveforms 600 include the waveforms associated with the various switches, S1, S2, S3, S6, and S7, of the boost switching converter. The proposed total number of switches (five) used in this Hybrid architecture is one less switch than that used in the prior art.

Typical hybrid architecture has a charge pump, including 4 switches and 2 capacitors, and a buck/boost switching converter, including 2 switches, 2 capacitors, and 1 inductor, for a total of 6 switches and 4 capacitors. The switching converter of the present disclosure has a charge pump, including 3 switches and 1 capacitor, and a buck/boost switching converter, including 2 switches, 2 capacitors, and 1 inductor, for a total of 5 switches and 3 capacitors.

The benefits of the proposed Hybrid architecture include combining the advantages of inductor-based DC-DC switching converters and switch capacitor converters into a single solution. This architecture further addresses the drawbacks of existing hybrid architectures, where the inductor at the output stage has to drive the entire output current and needs to be larger to have higher saturation current and lower DCR losses. Furthermore, with the capacitor in the first stage of the boost hybrid architecture and in the second stage of the buck hybrid architecture, a smaller voltage results in less derating on the capacitor.

For example, consider a 5V to 15V, 100 mA boost switching converter with a 2/1 charge pump in the first stage, followed by a boost converter in the second stage. The derating voltage on the flying capacitor of the present disclosure is 10V, as compared to 15V for a standard boost switching converter.

Further, in the standard boost converter, the inductor sees 300 mA of current, whereas in the switching converter of the disclosure, the capacitor in the first stage sees 300mA (ideally) and as capacitors do not change property with current, the current value has no impact on the capacitance of the flying capacitor.

Still further, in the same example, the inductor in the second stage of the disclosure sees only 200 mA of current. If the same inductor is used as in an ideal boost switching converter, then the inductor can see 300 mA, as compared to 100 mA for a standard boost switching converter.

The proposed Hybrid switching converter offers options to either improve power density and/or reduce the total solution size, along with improved efficiency performance. To illustrate improved power density, the proposed architecture is compared with that of a standard boost DC-DC switching converter, using the same passive components (inductors & capacitors). The amount of current which can be driven through the Hybrid switching converter of the disclosure is a multiple of the current driven in the boost converter, and the exact current value depends on the type of switch capacitor converter. For example, with a ½ switch capacitor converter, an increase in current is 2 times the current of a standard boost converter, and with a ¼ switch capacitor converter, the increase in current is 4 times the current of a standard boost converter.

Further, for the case of a multi-phase boost switching converter using the proposed Hybrid architecture, the number of phases can be reduced, as the main reason for a multi-phase switching converter is the current handling capability of the inductor. With the architecture of the disclosure, the current through the inductor is a fraction of the current of the prior art. Hence using the same inductor, the number of phases can be reduced significantly. As the number of phases are reduced, both a smaller solution area and an improved efficiency can be achieved with lesser components.

Alternately, if the same output current as in an equivalent boost converter is required, then the size of the passive components can be reduced significantly, as both the DC current and AC voltage swing are smaller in the proposed Hybrid switching converter. This in turn reduces the total solution area, along with improved AC/DC performance, as the smaller passive components have lower AC losses.

Still further, by operating the Hybrid architecture of the present disclosure in a reverse direction, for example, using the inductor in the first stage and the switched capacitor in the second stage, the topology can be used as a buck switching converter.

Figure 7:
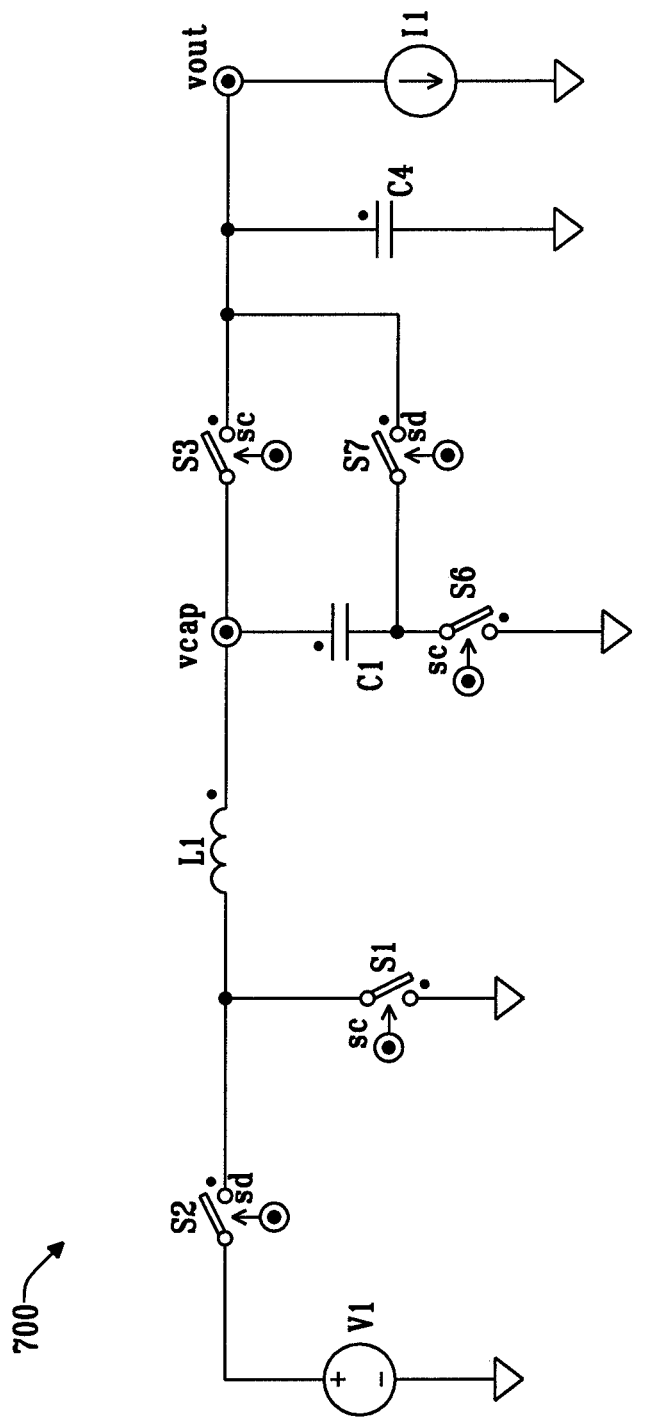
FIG. 7 shows a Hybrid buck architecture, with an inductor +2/1 switch capacitor converter, of the present disclosure.

FIG. 7 shows a Hybrid buck architecture, with an inductor +2/1 switch capacitor converter, of the present disclosure. Hybrid buck switching converter 700 includes an inductor L1 in the first stage and a 2/1 switch (S3, S7) capacitor converter in the second stage.

In the first stage of the Hybrid buck architecture, a first switch S2 is connected between input voltage V1 and a first node of an inductor L1, which is also a first node of a second switch S1. S1 is connected between the second node of S2 and a reference terminal (e.g. ground).

In the switch capacitor converter of the second stage of the Hybrid buck architecture, a first capacitor C1 is connected between intermediate node vcap, which is also a second node of L1, and a first node of a third switch S6, which is also a first node of a fourth switch S7. A fifth switch S3 is connected between vcap and a second node of S7, which is also a first node of a second capacitor C4 (and output voltage vout).

Switches S1, S3, and S6 are controlled by pulse waveform 'sc' and switches S2 and S7 are controlled by pulse waveform 'sd'. Switched capacitor C1 does not require a separate regulation loop as in the prior art, and a single regulation loop can be used for both the buck converter and switched capacitor circuits.

Figure 8:
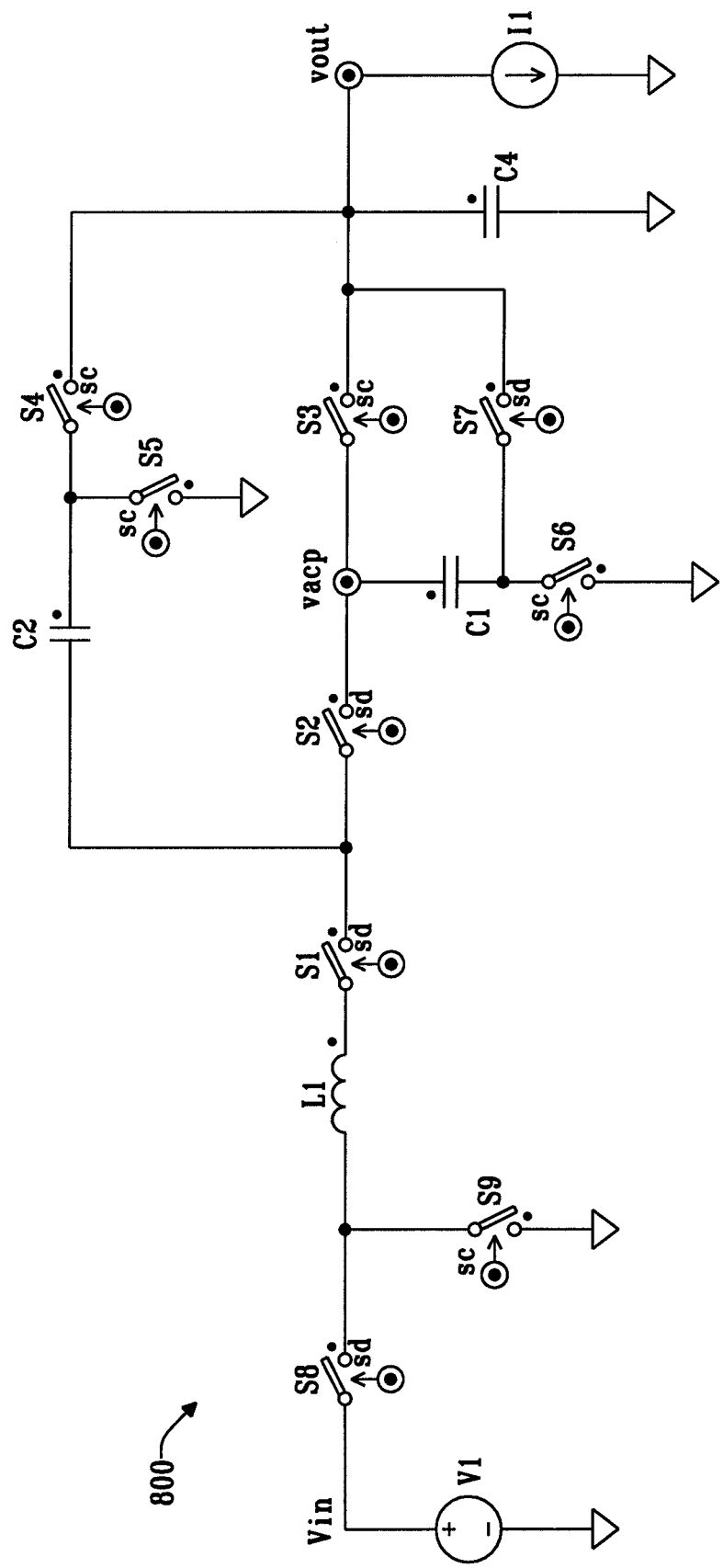
FIG. 8 shows a Hybrid buck architecture, with an inductor+3/1 switch capacitor converter, of the present disclosure.

FIG. 8 shows a Hybrid buck architecture, with an inductor +3/1 switch capacitor converter, of the present disclosure. Hybrid buck switching converter architecture 800 includes an inductor L1 in the first stage and a 3/1 switch (S3, S4, S7) capacitor converter in the second stage. Switches S3, S4, S5, S6, and S9 are controlled by pulse waveform 'sc' and switches S1, S2, S7, and S8 are controlled by pulse waveform 'sd'.

These Hybrid architectures include an inductor L1 based buck switching converter in the front end first stage and a switch capacitor circuit in the second stage. In FIGS. 7 and 8, the switch capacitor converter may further include a series-parallel, Dickson, ladder, doubler, or Fibonacci arrangement, etc.

Figure 9:
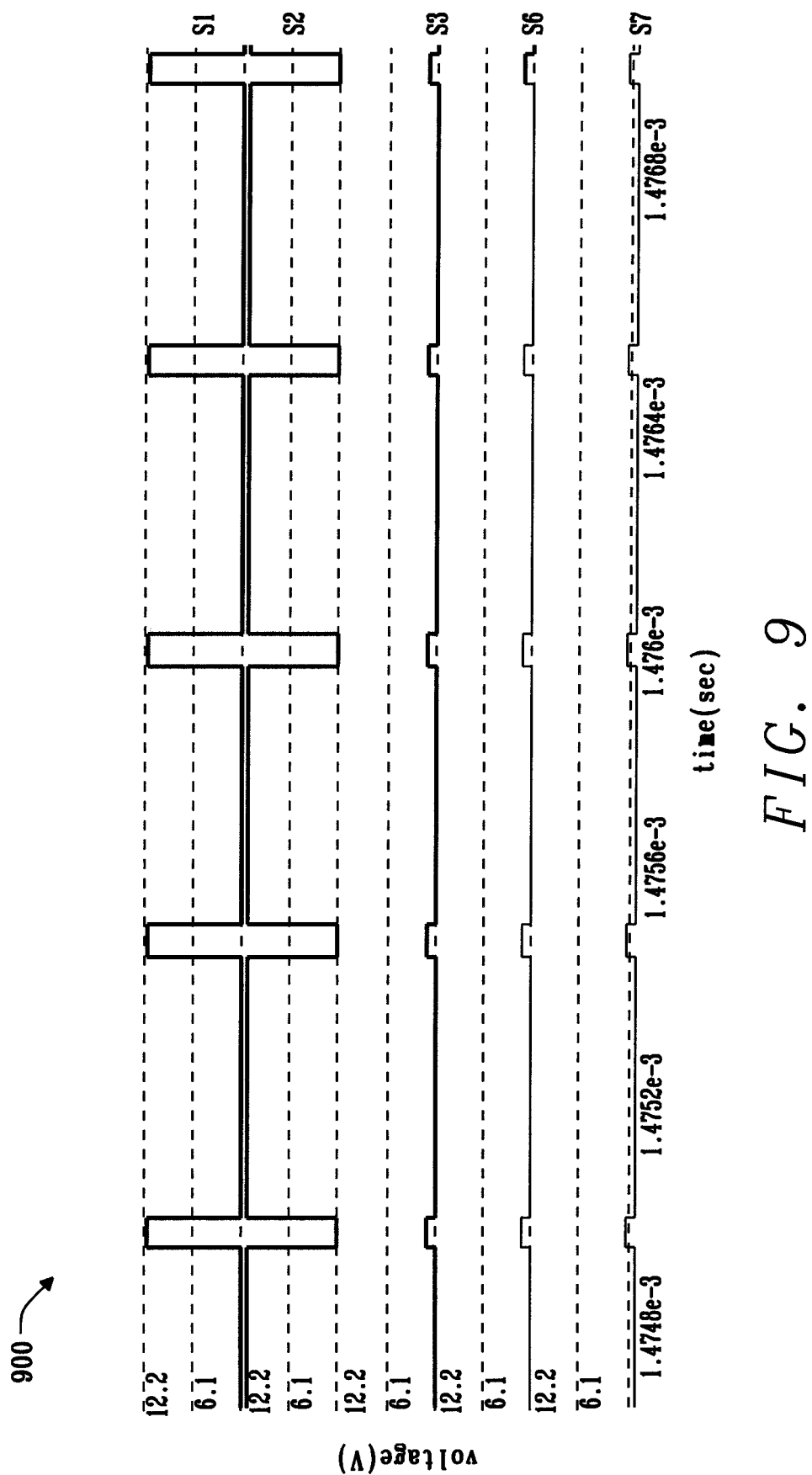
FIG. 9 shows timing waveforms for different switches of a Hybrid buck architecture.

FIG. 9 shows the timing waveforms for a Hybrid buck architecture. Timing waveforms 900 include the waveforms associated with the various switches, S1, S2, S3, S6, and S7, of the buck switching converter. The total number of switches used in the proposed Hybrid architecture is one less switch than that of the prior art.

Figure 10:
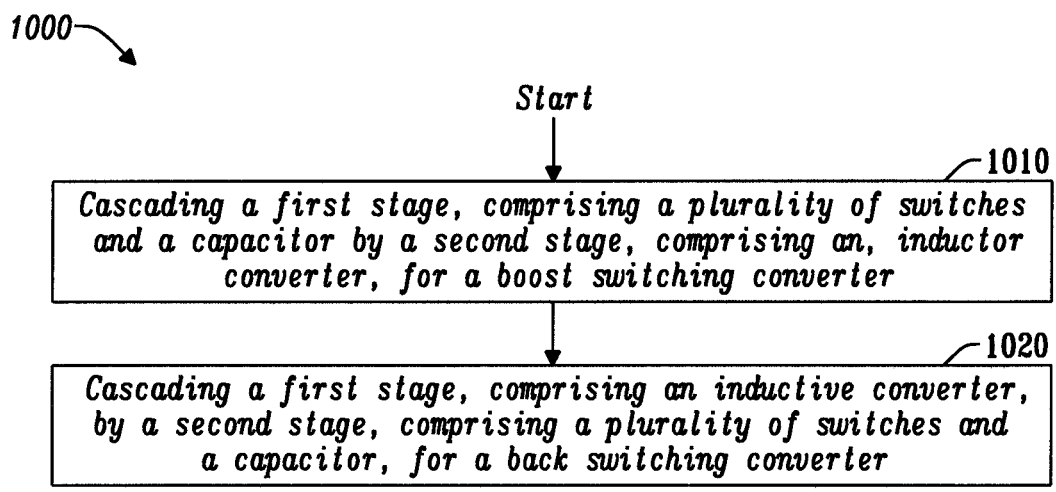
FIG. 10 is a flow chart of a method for Hybrid architecture in a DC-DC switching converter.

FIG. 10 is flow chart 1000, a method for Hybrid architecture in a DC-DC switching converter. The steps include 1010, cascading a first stage comprising a plurality of switches and a capacitor, by a second stage comprising an inductive converter, for a boost switching converter. The steps include 1020, cascading a first stage comprising an inductive converter, by a second stage comprising a plurality of switches and a capacitor, for a buck switching converter.

The proposed Hybrid architecture results in reducing the total switches implemented by one, and also results in reducing the total number of capacitors by one. These advantages remain for both boost and buck switching converter operation.

The Hybrid architecture, when implemented as a boost converter, addresses the key challenge of increasing power density, as the inductor is at the second stage and only sees a fraction of the input current. For example, in the case of 3.8V to 17V with 100mA DC current, only 280mA is seen, rather than 600mA in the case of the traditional boost converter. This allows the converter to achieve higher power density at high efficiency, as the alternate is to use a multi-phase architecture where efficiency can be lower, especially at light loads. This implementation also results in a smaller total solution size in comparison to other approaches.

Further, as the voltage swing across the capacitor and the current swing across the inductor is smaller, the AC losses are lower.

The proposed Hybrid structure when implemented in buck operation, as with boost operation, results in lower AC losses for higher voltage conversion ratios in comparison to a standard buck converter. For example, a 48V-1V hybrid converter results in significantly lower AC losses in comparison to a standard buck converter for the same conversion ratio, A 3.8V-1V hybrid converter results in slightly lower AC losses compared to a standard buck converter of the same conversion ratio.

The Hybrid architectures of the disclosure can be implemented as a fully integrated solution in the case of an Integrated Voltage Regulator (IVR) type application. Here, the entire voltage conversion from 3.8V (battery voltage) to 1V or 0.7V (micro-processor voltage) can be implemented as a fully integrated solution with silicon/package inductors and capacitors. Current solutions only describe integrating the second stage of the DC-DC switching converter with the first stage conversion, done by an off-chip buck converter with discrete inductors and capacitors.

While particular embodiments of the present disclosure have been illustrated and described, it will be understood by those skilled in the art that various changes in form and details may be made without departing from the spirit and scope of the invention.

What is claimed is:

1. A Hybrid DC-DC boost switching converter architecture, comprising:
   a first stage, comprising a capacitive converter, wherein the capacitive converter comprises a plurality of switches and a capacitor,
   wherein the plurality of switches and the capacitor comprises:
   a first resistor between an input voltage and a first node of a first switch, and a second resistor between the input voltage and a first node of a second switch;

a first capacitor connected between an intermediate node, which is also a second node of the first switch, and a first node of a third switch, which is also a second node of the second switch; and a third resistor between a second node of the third switch and a reference terminal (e.g. ground);

a second stage, comprising an inductive converter; and wherein the first stage is cascaded by the second stage.

2. The boost switching converter architecture of claim 1, wherein the inductive converter comprises:

a fourth resistor between the intermediate node and a first node of an inductor;

a first node of a fourth switch between a second node of the inductor and a fifth resistor, a sixth resistor between the second node of the inductor and a first node of a fifth switch; and a second capacitor between a second node of the fifth switch (which is also an output voltage) and a reference terminal (e.g. ground).

3. The boost switching converter architecture of claim 1, wherein the first and second stages are regulated with a single control circuit.

4. The switching converter architecture of claim 1, wherein the switches are configured to operate with fixed pulse waveforms.

5. The switching converter architecture of claim 1, wherein an amount of current driven through the switching converter is a multiple of a current driven in the first stage.

6. The switching converter architecture of claim 1, wherein the first and second stages are regulated with current mode control.

7. The switching converter architecture of claim 1, wherein the first and second stages are regulated with voltage mode control.

8. A Hybrid DC-DC buck switching converter architecture, comprising:

a first stage, comprising an inductive converter;

a second stage, comprising a capacitive converter, the capacitive converter comprising a plurality of switches and a capacitor, wherein the plurality of switches and the capacitor comprises:

a first resistor between an input voltage and a first node of a first switch, and a second resistor between the input voltage and a first node of a second switch;

a first capacitor connected between an intermediate node, which is also a second node of the first switch, and a first node of a third switch, which is also a second node of the second switch; and a third resistor between a second node of the third switch and a reference terminal (e.g. ground);

and wherein the first stage is cascaded by the second stage.

9. The buck switching converter architecture of claim 8, wherein the inductive converter comprises:

a first switch connected between an input voltage and a first node of an inductor, which is also a first node of a second switch, connected between the second node of the first switch and a reference terminal (e.g. ground).

10. The buck switching converter architecture of claim 8, wherein the plurality of switches and the capacitor comprises:

a first capacitor connected between an intermediate node, which is also a second node of the inductor, and a first node of a third switch, which is also a first node of a fourth switch; and a fifth switch connected between the intermediate node and a second node of the fourth switch, which is also a first node of a second capacitor (and an output voltage).

11. The boost switching converter architecture of claim 8, wherein the first and second stages are regulated with a single control circuit.

12. The switching converter architecture of claim 8, wherein the switches are configured to operate with fixed pulse waveforms.

13. The switching converter architecture of claim 8, wherein the capacitor converter further comprises a series-parallel, Dickson, ladder, doubler, or Fibonacci arrangement.

14. The switching converter architecture of claim 8, wherein the first and second stages are regulated with current mode control.

15. The switching converter architecture of claim 8, wherein the first and second stages are regulated with voltage mode control.

16. A method for a Hybrid DC-DC boost switching converter architecture, comprising:

cascading a first stage, comprising a plurality of switches and a capacitor, wherein the plurality of switches and the capacitor comprises:

a first resistor between an input voltage and a first node of a first switch, and a second resistor between the input voltage and a first node of a second switch;

a first capacitor connected between an intermediate node, which is also a second node of the first switch, and a first node of a third switch, which is also a second node of the second switch; and a third resistor between a second node of the third switch and a reference terminal (e.g. ground);

by a second stage, comprising an inductive converter.

17. The method of claim 16, wherein regulating the first and second stages of the hybrid DC-DC switching converter with a single control circuit.

18. The method of claim 16, wherein a multiple of a current driven in the first stage determines an amount of current driven through the switching converter.

19. The method of claim 16, wherein current mode control is used in the single control circuit.

20. The method of claim 16, wherein voltage mode control is used in the single control circuit.

21. A method for a Hybrid DC-DC buck switching converter architecture, comprising:

cascading a first stage, comprising an inductive converter, by a second stage, comprising a plurality of switches and a capacitor, wherein the plurality of switches and the capacitor comprises:

a first resistor between an input voltage and a first node of a first switch, and a second resistor between the input voltage and a first node of a second switch;

a first capacitor connected between an intermediate node, which is also a second node of the first switch, and a first node of a third switch, which is also a second node of the second switch; and a third resistor between a second node of the third switch and a reference terminal (e.g. ground).

22. The method of claim 21, wherein regulating the first and second stages of the hybrid DC-DC switching converter with a single control circuit.

23. The method of claim 21, wherein the second stage further comprises a series-parallel, Dickson, ladder, doubler, or Fibonacci arrangement.

24. The method of claim 21, wherein current mode control is used in the single control circuit.

25. The method of claim 21, wherein voltage mode control is used in the single control circuit.

* * * * *